United States Patent
Izuoka et al.

(10) Patent No.: US 6,895,366 B2
(45) Date of Patent: May 17, 2005

(54) SYSTEM, PROGRAM AND METHOD FOR PROVIDING REMEDY FOR FAILURE

(75) Inventors: Kouji Izuoka, Tokyo (JP); Tadaomi Nishiyama, Tokyo (JP); Hiroyuki Oikawa, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 232 days.

(21) Appl. No.: 10/268,105

(22) Filed: Oct. 10, 2002

(65) Prior Publication Data

US 2003/0088583 A1 May 8, 2003

(30) Foreign Application Priority Data

Oct. 11, 2001 (JP) ..................................... 2001-314307

(51) Int. Cl.$^7$ .................. G06F 11/30; G06F 15/00; G06F 17/30; G06F 19/00; G21C 17/00
(52) U.S. Cl. ................... 702/185; 702/183; 707/6; 701/29
(58) Field of Search ................... 700/90; 701/29; 702/183, 185; 707/3, 6

(56) References Cited

U.S. PATENT DOCUMENTS

| | | | | |
|---|---|---|---|---|
| 5,761,496 A | * | 6/1998 | Hattori | 707/5 |
| 5,950,196 A | * | 9/1999 | Pyreddy et al. | 707/5 |
| 6,317,741 B1 | * | 11/2001 | Burrows | 707/5 |
| 6,487,520 B1 | * | 11/2002 | Kurtzberg et al. | 702/183 |
| 6,571,236 B1 | * | 5/2003 | Ruppelt | 707/3 |
| 2001/0051958 A1 | * | 12/2001 | deVries et al. | 707/511 |
| 2002/0022969 A1 | * | 2/2002 | Berg et al. | 705/1 |
| 2002/0026435 A1 | * | 2/2002 | Wyss et al. | 707/1 |
| 2003/0061072 A1 | * | 3/2003 | Baker et al. | 705/3 |
| 2003/0066025 A1 | * | 4/2003 | Garner et al. | 715/500 |
| 2004/0073403 A1 | * | 4/2004 | Hart et al. | 702/183 |

FOREIGN PATENT DOCUMENTS

| | | |
|---|---|---|
| JP | 2001-154848 | 6/2001 |
| JP | 2001-160097 | 6/2001 |

* cited by examiner

Primary Examiner—Leo Picard
Assistant Examiner—Ryan Jarrett
(74) Attorney, Agent, or Firm—Arent Fox PLLC

(57) ABSTRACT

To provide a troubleshooting support system that has a function of retrieving a remedy based on a word in a user's speech. A system for providing a remedy for failure of a product composed of a plurality of parts comprises a unit for entering information about failure including a free word, an extracting unit for extracting keywords from the free word, a remedy database storing remedies for failures, and a unit for searching the remedy database using the extracted keywords. The remedy database is searched using keywords derived from a user's speech. Weights assigned to the respective keywords are applied to the hit remedies for calculating priorities of the remedies.

6 Claims, 7 Drawing Sheets

SCORING FOR REMEDY 3 (REPLACEMENT OF FUEL PUMP)

| | | WEIGHT | NUMBER OF HITS | SCORE |
|---|---|---|---|---|
| KEYWORD FROM BASIC INFORMATION | MODEL | 0.9 | 1 | 0.9 |
| | FAILED PART | 0.5 | 1 | 0.5 |
| | ROUGH CLASSIFICATION | 0.5 | 1 | 0.5 |
| | SYMPTOM | 0.7 | 1 | 0.7 |
| KEYWORD FROM REE WORD | | 0.9 | 2 | 1.8 |
| KEYWORD FROM INQUIRY (FAILURE SITUATION) | | 0.7 | 3 | 2.1 |
| KEYWORD FROM SYNONYM | WHEN | 0.3 | 1 | 0.3 |
| | FAILED PART | 0.4 | 1 | 0.4 |
| | ABNORMAL SOUND | 0.8 | 1 | 0.8 |
| INFORMATION EFFECTIVENESS | EFFECTIVENESS | 1.0 | 1 | 1.0 |
| | RETRIEVAL FREQUENCY | 0.5 | 1 | 0.5 |
| TOTAL SCORE | | | | 9.5 |

Fig. 2

| | | |
|---|---|---|
| POPULAR NAME | ODYSSEY /101 | MODEL RA2 /103 |
| TYPE B /105 | MODEL YEAR 99 /106 | AT/MT CLASSIFICATION AT /107 |

FAILED PART NUMBER ⬚ /109

FAILED PART /111
A ENGINE
B BRAKE
D TRANSMISSION
M MISSION
Q SUPPLY AND EXHASUT SYSTEM

ROUGH CLASSIFICATION /113
PERIPHERALS OF AUDIO SET
PERIPHERALS OF AIR CONDITIONER

SYMPTOM /115
093 STALL
042 ABNORMAL SOUND
032 MALFUNCTION
060 LEAKAGE
045 VIBRATION

SITUATION /117

| ROAD | WEATHER | ENGINE TEMPERATURE | FREQUENCY |
|---|---|---|---|
| ☐ SPPEDWAY | ☐ CLEAR | ☑ COLD | ☐ ALWAYS |
| ☑ ORDINARY ROAD | ☑ CLOUD | ☐ DURING WARMING UP | ☑ SOMETIMES |
| ☐ BAD ROAD | ☐ RAIN | ☐ AFTER WARMING UP | |
| ☐ SLOPING ROAD | ☐ SNOW | ☐ HOT | |
| ☐ BUMPY ROAD | | | |

FREE WORD  STARTER SOUNDS WITHOUT ENGINE START /119

Fig. 3

QUESTION ENTRY

|  |  | ENTRY VALUE |
|---|---|---|
| MODEL | | RA2 |
| FAILED PART | | A ENGINE |
| ROUGH CLASSIFICATION | | START |
| SYMPTOM | | 032 MALFUNCTION |
| INQUIRY (FAILURE SITUATION) | ROAD | ORDINARY ROAD |
| | WEATHER | CLOUD |
| | ENGINE TEMPERATURE | COLD |
| | FREQUENCY | SOMETIMES |
| FREE WORD | | STARTER SOUNDS WITHOUT ENGINE START |

Fig. 4

|  |  | ENTRY VALUE |
|---|---|---|
| MODEL |  | RA2 |
| FAILED PART |  | A ENGINE |
| ROUGH CLASSIFICATION |  | START |
| SYMPTOM |  | 032 MALFUNCTION |
| INQUIRY (FAILURE SITUATION) | ROAD | ORDINARY ROAD |
|  | WEATHER | CLOUD |
|  | ENGINE TEMPRATURE | COLD |
|  | FREQUENCY | SOMETIMES |
| KEY WORDS DERIVED FROM FREE WORD |  | ENGINE |
|  |  | START |
|  |  | STARTER SOUND |

Fig. 5

EXAMPLE OF RETRIEVAL: HITS FOR REMEDY 3
(REPLACEMENT OF FUEL PUMP)

| | | | |
|---|---|---|---|
| KEYWORD FROM BASIC INFORMATION | MODEL | RA2 | Hit |
| | FAILED PART | ENGINE | Hit |
| | ROUGH CLASSIFICATION | START | Hit |
| | SYMPTOM | 032 MALFUNCTION | Hit |
| KEYWORD BASED ON INQUIRY (FAILURE SITUATION) | ROAD | ORDINARY ROAD | Hit |
| | WEATHER | CLOUD | No |
| | ENGINE TEMPERATURE | COLD | Hit |
| | FREQUENCY | SOMETIMES | hit |
| KEYWORD BASED ON FREE WORD | | ENGINE | hit |
| | | START FAILURE | hit |
| | | STARTER SOUND | no |
| KEYWORD BASED ON SYNONYM | WHEN: COLD | FIRST IN THE MORNING | hit |
| | | WINTER | no |
| | WHERE: ENGINE | STARTER | hit |
| | ABNORMAL SOUND: STARTER SOUND | WHINE,WHINE | hit |

Fig. 6

SCORING FOR REMEDY 3 (REPLACEMENT OF FUEL PUMP)

| | | WEIGHT | NUMBER OF HITS | SCORE |
|---|---|---|---|---|
| KEYWORD FROM BASIC INFORMATION | MODEL | 0.9 | 1 | 0.9 |
| | FAILED PART | 0.5 | 1 | 0.5 |
| | ROUGH CLASSIFICATION | 0.5 | 1 | 0.5 |
| | SYMPTOM | 0.7 | 1 | 0.7 |
| KEYWORD FROM REE WORD | | 0.9 | 2 | 1.8 |
| KEYWORD FROM INQUIRY (FAILURE SITUATION) | | 0.7 | 3 | 2.1 |
| KEYWORD FROM SYNONYM | WHEN | 0.3 | 1 | 0.3 |
| | FAILED PART | 0.4 | 1 | 0.4 |
| | ABNORMAL SOUND | 0.8 | 1 | 0.8 |
| INFORMATION EFFECTIVENESS | EFFECTIVENESS | 1.0 | 1 | 1.0 |
| | RETRIEVAL FREQUENCY | 0.5 | 1 | 0.5 |
| TOTAL SCORE | | | | 9.5 |

Fig. 7

SCORING FOR REMEDY 15 (CHECK OF VOLTAGE OF ELECTRIC SYSTEM)

| | | WEIGHT | NUMBER OF HITS | SCORE |
|---|---|---|---|---|
| KEYWORD FROM BASIC INFORMATION | MODEL | 0.9 | 1 | 0.9 |
| | FAILED PART | 0.5 | 1 | 0.5 |
| | ROUGH CLASSIFICATION | 0.5 | 1 | 0.5 |
| | SYMPTOM | 0.7 | 1 | 0.7 |
| KEYWORD FROM FREE WORD | | 0.9 | 1 | 0.9 |
| KEYWORD FROM INQUIRY (FAILURE SITUATION) | | 0.7 | 2 | 1.4 |
| KEYWORD FROM SYNONYM | WHEN | 0.3 | 1 | 0.3 |
| | FAILED PART | 0.4 | 1 | 0.4 |
| | ABNORMAL SOUND | 0.8 | 1 | 0.8 |
| INFORMATION EFFECTIVENESS | EFFECTIVENESS | 0.8 | 1 | 0.8 |
| | RETRIEVAL FREQUENCY | 0.7 | 1 | 0.7 |
| TOTAL SCORE | | | | 7.9 |

100
SYSTEM, PROGRAM AND METHOD FOR PROVIDING REMEDY FOR FAILURE

BACKGROUND OF THE INVENTION

1. Field of the Invention

The present invention relates to a system for providing a remedy for a failure of a product. In particular, it relates to a system that provides a remedy for a failure of a product composing a plurality of parts, such as a vehicle, in response to input of information on the failure.

2. Description of the Related Art

Reactions of repair shops or dealers to failures or troubles of a sophisticated product, such as a vehicle, depend on experience of service staff that deals with the failures. In order to enable staff with little experience to readily deal with a failure, an instruction manual may be prepared. However, it is burdensome to prepare repair manuals for products appearing one after another. Such burdensomeness is encountered when the manuals are to be updated by reflecting accumulated experiences.

It may be contemplated that a database for the manual is provided on a computer network, and a service staff accesses the manual as required. Japanese Patent Application Laid-Open No. 2001-160097 describes maintenance of an air conditioner or the like, in which a memory that stores know-how is provided, a weight of attribute information, such as an experienced staff, is stored therein, and a support staff is retrieved according to the weight, whereby the user and the support staff can cooperate with each other.

Japanese Patent Application Laid-Open No. 2001-154848 describes a problem-solving support system. An input query description that is short of conditions is compensated for with an optimal condition extracted from similar cases that were solved in the past. A problem-solving process is executed for the input question thus made up for.

A products, such as an automobile and motorcycle, that is composed of quite many parts and includes many movable parts shows various symptoms depending on the usage conditions, the length of usage, the maintenance condition or the like. When a user asks a repair shop, service center or the like to repair a product in a failure or trouble, he/she explains the trouble in words. Therefore, there is a need for a troubleshooting support system that has a function of retrieving an optimal remedy based on words in a user's speech.

SUMMARY OF THE INVENTION

A system according to one embodiment of this invention is a system for providing a remedy for a failure of a product composed of a plurality of parts, comprising means for entering information about a failure, said information including at least a portion that is represented by one or more free words. The system includes extracting means for extracting keywords from the one or more free words, a remedy database for storing remedies for failures registered therewith, the database being searched according to keywords. The system further includes means for searching the remedy database using the extracted keywords, applying weights assigned to the respective keywords to the hit results for each of a plurality of remedies that are hit for calculating priorities of the plurality of remedies.

According to this invention, the remedy database is searched using keywords extracted from a user's speech. Weights assigned to the respective keywords are applied to the hit results for calculating priorities of the remedies. Relations between remedies and the keywords substantially vary.

According to one aspect of the invention, weights assigned to the respective keywords are applied to the hit results, and priority calculation is performed for two or more remedies. Thus, an appropriate remedy can be chosen.

In one aspect of this invention, the support system further comprises a synonym database, and the keyword extracting means searches the synonym database using as a key one or more words included in the one or more free words. One or more synonyms of such words are also used as a key to search the synonym database. According to this aspect, the keyword searching can be performed using not only words in the user's speech but also the synonyms, and thus, the reliability of the support system is improved.

In another aspect of the invention, the remedy database stores a value indicating an effectiveness of each of said remedies, and the value is updated when a corresponding remedy is actually applied and is effective. Therefore, the reliability of the support system is enhanced as it is used.

BRIEF DESCRIPTION OF THE DRAWINGS

FIG. 2 shows one example of a question entry screen displayed on a personal computer 10 at a service shop;

FIG. 3 shows question entries at the service shop;

FIG. 4 shows the question entries at the service shop, which are adapted for database search;

FIG. 5 shows keyword hits for a remedy 3 to a failure;

FIG. 6 shows a score calculated from the keyword hits for the remedy 3; and

FIG. 7 shows a score calculated from the keyword hits for a remedy 15.

DETAILED DESCRIPTION OF THE PREFERRED EMBODIMENTS

Figure 1:
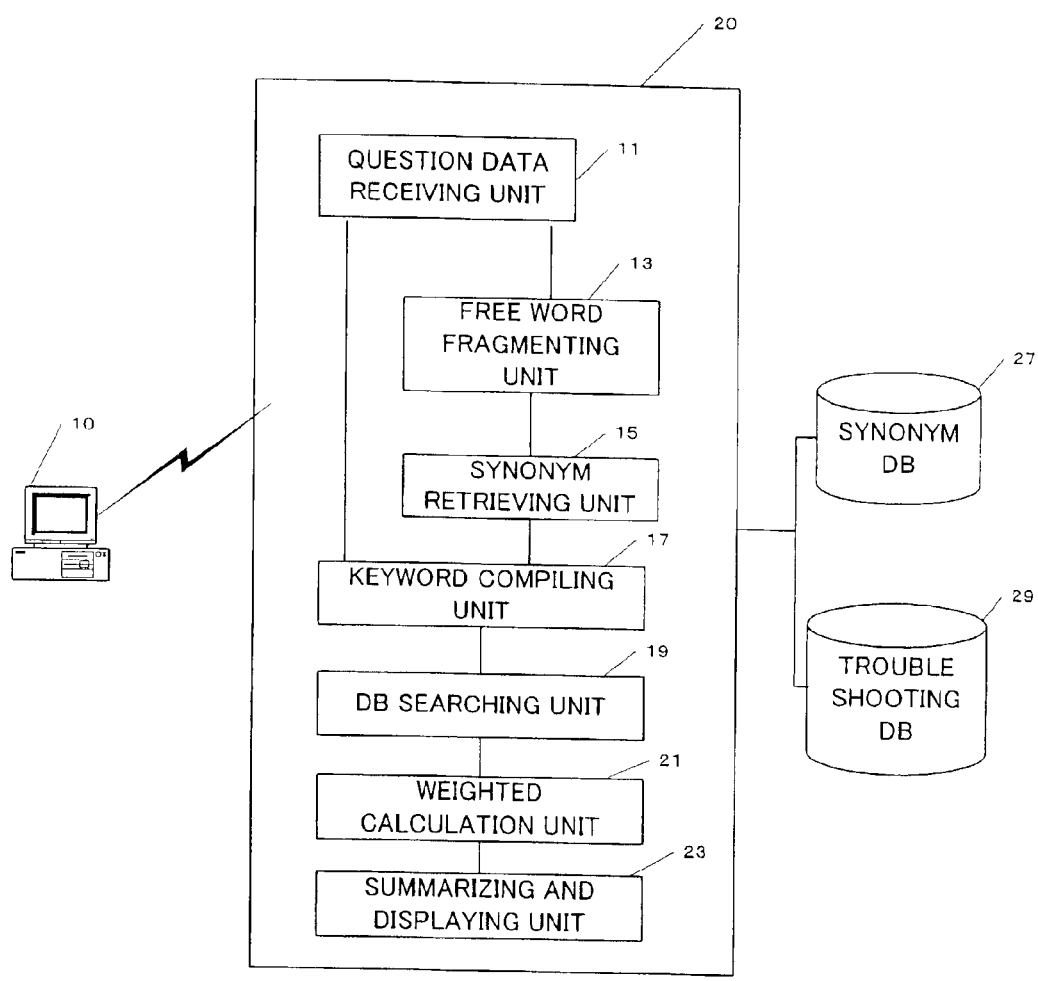
FIG. 1 is a block diagram showing an overall configuration of a troubleshooting support system according to this invention.

Now, an embodiment of this invention will be described with reference to the drawings. A system according to one embodiment comprises a personal computer 10 located at a repair shop, service center, dealer or the like and a server 20 connected to the computer 10 via a network. While the computer 10 is connected to the server 20 via the Internet in this embodiment, other networks may be adopted. In the embodiment described below, an automobile is taken as an example of a product, and the personal computer 10 is located at a service factory. The server 20, which is located at a computer center of the automobile company, receives queries from personal computers 10 located at nationwide service factories via the Internet and replies to them after computation.

Now, it is assumed that a customer asks a service factory to solve a trouble of an unstable engine start. Staff of the service factory asks the user about symptoms the car shows, and activates the browser of the personal computer 10 to access a website of a troubleshooting support system of the server 20.

FIG. 2 shows one example of a screen transmitted from the website and displayed on the browser of the personal computer 10. The screen includes fields for entering bibliographic items of the car, that is, a field 101 for entering a popular name of the car, an entry field 103 for a model of the car, an entry field 105 for a type of the car, an entry field 106 for a model year of the car, an entry field 107 for classification of the transmission type, automatic transmission (AT) or manual transmission (MT), and an entry field 109 for the number of a failed part. In general, cars are redesigned every several years, and thus, cars called by the same popular name may be of different models. Therefore, these fields are essential for diagnosis of failures specific to a car.

In addition, the entry screen includes a scroll field 111 for selecting a failed part, a scroll field 113 for entry of rough classification of the failed part, and a scroll field 115 for entry of a symptom of the car. In addition to these entry fields, according to the embodiment of this invention, there is provided an inquiry entry field 117 that allows the staff of the service factory to enter conditions, heard from the user, in which the failure or trouble occurs. In the example shown in FIG. 2, the inquiry entry field includes a road condition selection sub-field, a weather selection sub-field, an engine temperature entry sub-field, and a failure frequency entry sub-field.

In one embodiment of the invention, the entry screen includes a field 119 for entering a symptom of the car in a free word. The free word field is intended for the symptom of the car that the user has told. The field enables a delicate nuance of the failure or trouble to be included in the query to the support system.

When the service staff finishes entry of these items and clicks a transmission button on the screen, the entry data is transmitted to the server 20. The server 20 has a support program installed therein that provides a remedy for a failure in response to a query. The block diagram of the server 20 shown in FIG. 1 illustrates functional blocks of such a support program.

A question data receiving unit 11 receives the data transmitted from the personal computer 10, passes data in the free word field to a free word fragmenting unit 13, passes data in the failure situation (inquiry) field 117 to a synonym retrieving unit 15, and passes data in the other fields to a keyword compiling unit 17. The free word-fragmenting unit 13 has a document analysis function of fragmenting a free word into separate words. The document analysis function may be the one used in a translation program from Japanese to English, for example.

The words derived from the free keyword and the words in the failure situation field 117 are passed to the synonym-retrieving unit 15. The synonym-retrieving unit 15 searches a synonym database 27 using the words as keys. The synonym database 27 stores synonyms and quasi-synonyms of the respective words. The synonym-retrieving unit 15 passes, to the keyword-compiling unit 17, the data in the failure situation field 117 and words resulting from fragmentation in the free word-fragmenting unit together with the synonyms and quasi-synonyms thus obtained. The keyword-compiling unit 17 compiles the bibliographic data of the car received from the question data-receiving unit and the words received from the synonym-retrieving unit 15 and passes them to a database-searching unit 19.

The database-searching unit 19 searches a troubleshooting (remedy) database 29 using the words as keys. The troubleshooting database 29 stores remedies relating to vehicle types, symptoms, failure situations or the like.

The database is equivalent to a knowledge database that accumulates knowledge and experience of an experienced service staff. The remedies are each assigned words used for describing the vehicle types, symptoms, failure situations or the like as keywords. Searching the database is partially similar to searching for patent information or a technical document. However, it is significantly different in that the keywords used are words relating to symptoms of the car, failure situations, bibliographic information about the car or the like, rather than words included in the description of the remedy that is searched for.

The retrieval results of the database-retrieving unit 19 are passed to a weighted calculation unit 21. For each of the retrieved remedies, the weighted calculation unit multiplies the number of hit keywords by weights predetermined for the respective keywords to calculate a score for each of the remedies, and passes top several remedies to a summarizing and displaying unit 23.

The summarizing and displaying unit 23 edits the received top several remedies in the form of an html document and transmits the document to the personal computer 10 via the Internet. In this way, the service staff can obtain remedy candidates based on the experienced service staffs knowledge by transmitting to the server the information about the failure of the car including the free word obtained by conversation with the user.

Now, referring to FIGS. 3 to 7, a program executed by the server 20 will be described in detail. FIG. 3 shows data entered via the computer screen shown in FIG. 2 to be transmitted to the server 20. FIG. 4 shows the data in FIG. 3 with the free word description "starter sounds without engine start" being fragmented into words by the free word fragmenting unit 13 and the words being extracted as keywords.

FIG. 5 shows a result of the database-searching unit searching the troubleshooting database 29 after the synonym-retrieving unit 15 retrieves the synonyms of the keywords obtained by inquiry and derived from the free word. In this example, for a keyword "cold", synonyms "first in the morning" and "winter" are retrieved. For a keyword "engine", a word "starter" is retrieved, and for a keyword "starter sound", an echo word "whine, whine" is retrieved.

In one embodiment, the search of the database 29 is accomplished by detecting matches between the keywords shown in FIG. 5 and the keywords assigned to each of the three hundred remedies, for example, stored in the database.

According to another embodiment, the database is searched using the keywords based on basic information in the table shown in FIG. 5 as keys. Then, for example, for each of the fifteen remedies that are hit, it is checked whether any hit is found for the keywords based on inquiry, the keywords derived from the free word and the synonyms used as keywords. By layering the search operation in this way, the search can be narrowed successively, and thus, the search rate can be increased. Depending on the size of the database, a three-layer or four-layer structure can be provided.

In the rightmost column in FIG. 5, hit results of keywords for a remedy 3 (replacement of fuel pumps) are shown. The keywords are weighted according to the significance. FIG. 6 shows an example of the weights. In the basic information, a keyword relating to the model is assigned a weight of 0.9, a keyword relating to the failed part is assigned a weight of 0.5, and a keyword relating to the rough classification is assigned a weight of 0.5. A keyword derived from the free word is assigned a weight of 0.9, a keyword based on inquiry is assigned a weight of 0.7. As for a keyword from the synonym, a keyword relating to the time when the failure occurs is assigned a weight of 0.3, a keyword relating to the failed part is assigned a weight of 0.4, and a keyword relating to the abnormal sound is assigned a weight of 0.8.

In this example, the effectiveness and retrieval frequency, which indicate effectiveness of the information, are assigned weights of 1.0 and 0.5, respectively. The information effectiveness is set reflecting a history of the remedy. These values are different from the weights assigned to the keywords in that they are assigned to each of the remedies. If the remedy is effective for a failure, the effectiveness is upgraded in response to feedback from the service shop. The retrieval frequency indicates the frequency of retrieval of the remedy and is significant in an embodiment in which hierarchical database search is performed. Each remedy includes these items, and thus, they are simply shown in terms of scores in the drawing.

The weighted calculation unit 21 calculates a score for each keyword by multiplying the number of hits for the keyword by the weight assigned to the keyword. In the embodiment shown in FIG. 6, with respect to the keywords derived from the free word and the keywords obtained by inquiry, individual keywords are assigned the same weight, respectively. For the keyword derived from the free word, the number of hits is 2 and its weight is 0.9, and therefore, the score is 1.8. For the keyword obtained by inquiry, the number of hits is 3 and the weight is 0.7, and thus, the score is 2.1.

For the keywords based on the synonym, different kinds of keywords are assigned different weights. The keyword relating to the time when the failure occurs is assigned a weight of 0.3, the keyword relating to the failed part is assigned a weight of 0.4, and the keyword relating to the abnormal sound is assigned a weight of 0.8.

These weights may be set separately for each remedy or uniformly for all the remedies. To enhance effectiveness, each keyword is preferably assigned a weight adapted for the remedy.

In the example shown in FIG. 6, the total score of the remedy 3 (replacement of fuel pump) is 9.5. FIG. 7 shows a hit result and the score of a remedy number 15 (checking voltage of electrical system) for the same question. The summarizing and displaying unit 23 transmits the top five remedies with their respective scores to the personal computer 10 in the form of an HTML document. Thus, the staff of the service shop can view a plurality of optimal remedies for the question and the respective scores on the computer. Instead of the scores, the summarizing and displaying unit may transmit priorities of the remedies, indicated by symbols A, B and C or the like, to the personal computer.

In general, the service staff starts from the remedy of the highest score. If a remedy is effective for a failure, the service staff at the service shop connects the personal computer to the server 20, activates the support system, invokes the feedback screen on the browser, and makes an entry that the remedy 3, for example, was effective. In response to this, the server 20 updates the effectiveness of the remedy 3 from 1.0, the current value, to 1.1.

In this way, in the troubleshooting support system according to this invention, the knowledge database that accumulates the knowledge and experience of an experienced service staff further learns effectiveness of the remedies for failures.

A specific embodiment of this invention has been described above. However, this invention is not limited to the embodiments.

What is claimed is:

1. A computer based system for providing a remedy for a failure of a product composed of a plurality of parts, comprising:

means for entering information about said failure, said information comprising one or more free words;

extracting means for extracting keywords from said one or more free words;

a remedy database for storing remedies for failures registered therewith, the database being configured to be searched according to keywords; and means for:

obtaining a plurality of the remedies stored in the remedy database based at least on the extracted keywords, thereby creating a group of obtained remedies;

assigning a priority value to each of the obtained remedies based at least on a numerical weight associated with an inclusion of any of the extracted keywords in the obtained remedy and a number of the extracted keywords included in the obtained remedy; and ranking each of the obtained remedies based on the priority value associated with each obtained remedy, wherein said remedy database stores values each indicating effectiveness of each of said remedies, said value being updated in response to entry of data indicating that the remedy corresponding to the value was used and was useful.

2. The system according to claim 1, further comprising a synonym database, wherein said extracting means is configured to search the synonym database using as a key a word included in the one or more free words and one or more synonyms of said word.

3. A computer executable program for providing a remedy for a failure of a product composed of a plurality of parts, wherein the program makes a computer perform the functions of:

in response to entry of information about a failure represented at least by one or more free words, extracting keywords from said free words;

searching a remedy database storing remedies for failures registered therewith using said extracted keywords obtaining a plurality of the remedies stored in the remedy database based at least on the extracted keywords, thereby creating a group of obtained remedies;

assigning a priority value to each of the obtained remedies based at least on a numerical weight associated with an inclusion of any of the extracted keywords in the obtained remedy and a number of the extracted keywords included in the obtained remedy; and ranking each of the obtained remedies based on the priority value associated with each obtained remedy, wherein said remedy database stores a value indicating an effectiveness of each of said remedies and the program further includes a function of updating the value in response to entry of data indicating that one of said remedies was actually used and was effective.

4. The program according to claim 3, wherein said extraction function includes a function of searching a synonym database using as a key a word included in said free word and one or more synonyms of the word.

5. A computer-implemented method for providing a remedy for a failure of a product composed of a plurality of parts, comprising:

extracting one or more keywords from one or more free words in response to entry of information about a failure represented by at least one or more free words, searching a remedy database storing remedies for failures registered therewith using said extracted keywords;

obtaining a plurality of the remedies stored in the remedy database based at least on the extracted keywords, thereby creating a group of obtained remedies;

assigning a priority value to each of the obtained remedies based at least on a numerical weight associated with an inclusion of any of the extracted keywords in the obtained remedy and a number of the extracted keywords included in the obtained remedy; and ranking each of the obtained remedies based on the priority value associated with each obtained remedy, wherein said remedy database stores a value indicating an effectiveness of each of said remedies and the method further comprises updating the value in response to entry of data indicating that one of said remedies was actually used and was effective.

6. The method according to claim 5, wherein said extracting step further comprises searching a synonym database using as a key one or more words included in the free words and one or more synonyms of the words.

* * * * *